(12) United States Patent
Bullotta et al.

(10) Patent No.: US 9,348,943 B2
(45) Date of Patent: *May 24, 2016

(54) METHOD FOR ANALYZING TIME SERIES ACTIVITY STREAMS AND DEVICES THEREOF

(71) Applicant: PTC Inc., Needham, MA (US)

(72) Inventors: Rick Bullotta, Phoenixville, PA (US); John Schaefer, Ambler, PA (US)

(73) Assignee: PTC Inc., Needham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/563,191

(22) Filed: Dec. 8, 2014

(65) Prior Publication Data

US 2015/0213152 A1    Jul. 30, 2015

Related U.S. Application Data

(63) Continuation of application No. 13/678,809, filed on Nov. 16, 2012, now Pat. No. 8,909,641.

(60) Provisional application No. 61/560,390, filed on Nov. 16, 2011.

(51) Int. Cl.
    *G06F 7/00*      (2006.01)
    *G06F 17/30*     (2006.01)
    *H04L 12/26*     (2006.01)

(52) U.S. Cl.
    CPC .... *G06F 17/30964* (2013.01); *G06F 17/30283* (2013.01); *G06F 17/30551* (2013.01); *H04L 43/08* (2013.01)

(58) Field of Classification Search
    None
    See application file for complete search history.

(56) References Cited

U.S. PATENT DOCUMENTS

| | | |
|---|---|---|
| 3,656,112 A | 4/1972 | Paull |
| 3,916,412 A | 10/1975 | Amoroso, Jr. |
| 3,983,484 A | 9/1976 | Hodama |
| 4,063,173 A | 12/1977 | Nelson et al. |
| 4,103,250 A | 7/1978 | Jackson |
| 4,134,068 A | 1/1979 | Richardson |

(Continued)

FOREIGN PATENT DOCUMENTS

| | | |
|---|---|---|
| EP | 0497010 A2 | 8/1992 |
| EP | 1187015 A2 | 3/2002 |

(Continued)

OTHER PUBLICATIONS

Shi, L. et al., Understanding Text Corpora with Multiple Facets, IEEE Symposium on Visual Analytics Science and Technology (VAST), 99-106 (2010).

(Continued)

*Primary Examiner* — Tuan A Pham
(74) *Attorney, Agent, or Firm* — Choate, Hall & Stewart-LLP; William R. Hardbrook; Santiago Velez (57) ABSTRACT

A method, non-transitory computer readable medium, and data manager computing device comprises retrieving a time series data of a monitored asset based on one or more tags in response to a request. Further, a heterogeneous data based on the one or more tags is retrieved. Furthermore, a cause of an anomaly period in retrieved time series data of the monitored asset is determined based on the retrieved heterogeneous data. Finally, the determined cause of the anomaly period in the time series data in the monitored asset is provided.

16 Claims, 6 Drawing Sheets

(56) References Cited

U.S. PATENT DOCUMENTS

| | | |
|---|---|---|
| 4,216,546 A | 8/1980 | Litt |
| 4,554,668 A | 11/1985 | Deman et al. |
| 4,601,059 A | 7/1986 | Gammenthaler |
| 4,680,582 A | 7/1987 | Mejia |
| 4,704,585 A | 11/1987 | Lind |
| 4,887,204 A | 12/1989 | Johnson et al. |
| 4,979,170 A | 12/1990 | Gilhousen et al. |
| 5,113,416 A | 5/1992 | Lindell |
| 5,134,615 A | 7/1992 | Freeburg et al. |
| 5,159,704 A | 10/1992 | Pirolli et al. |
| 5,276,703 A | 1/1994 | Budin et al. |
| 5,361,401 A | 11/1994 | Pirillo |
| 5,422,889 A | 6/1995 | Sevenhans et al. |
| 5,454,010 A | 9/1995 | Leveque |
| 5,479,441 A | 12/1995 | Tymes et al. |
| 5,493,671 A | 2/1996 | Pitt et al. |
| 5,515,365 A | 5/1996 | Sumner et al. |
| 5,734,966 A | 3/1998 | Farrer et al. |
| 5,737,609 A | 4/1998 | Reed et al. |
| 5,805,442 A | 9/1998 | Crater et al. |
| 5,892,962 A | 4/1999 | Cloutier |
| 5,909,640 A | 6/1999 | Farrer et al. |
| 5,925,100 A | 7/1999 | Drewry et al. |
| 6,169,992 B1 | 1/2001 | Beall et al. |
| 6,182,252 B1 | 1/2001 | Wong et al. |
| 6,198,480 B1 | 3/2001 | Cotugno et al. |
| 6,377,162 B1 | 4/2002 | Delestienne et al. |
| 6,430,602 B1 | 8/2002 | Kay et al. |
| 6,473,788 B1 | 10/2002 | Kim et al. |
| 6,510,350 B1 | 1/2003 | Steen, III et al. |
| 6,553,405 B1 | 4/2003 | Desrochers |
| 6,570,867 B1 | 5/2003 | Robinson et al. |
| 6,618,709 B1 | 9/2003 | Sneeringer |
| 6,675,193 B1 | 1/2004 | Slavin et al. |
| 6,757,714 B1 | 6/2004 | Hansen |
| 6,766,361 B1 | 7/2004 | Venigalla |
| 6,797,921 B1 | 9/2004 | Niedereder et al. |
| 6,810,522 B2 | 10/2004 | Cook et al. |
| 6,813,587 B2 | 11/2004 | McIntyre et al. |
| 6,850,255 B2 | 2/2005 | Muschetto |
| 6,859,757 B2 | 2/2005 | Muehl et al. |
| 6,915,330 B2 | 7/2005 | Hardy et al. |
| 6,980,558 B2 | 12/2005 | Aramoto |
| 6,993,555 B2 | 1/2006 | Kay et al. |
| 7,031,520 B2 | 4/2006 | Tunney |
| 7,046,134 B2 | 5/2006 | Hansen |
| 7,047,159 B2 | 5/2006 | Muehl et al. |
| 7,054,922 B2 | 5/2006 | Kinney et al. |
| 7,082,383 B2 | 7/2006 | Baust et al. |
| 7,082,460 B2 | 7/2006 | Hansen et al. |
| 7,117,239 B1 | 10/2006 | Hansen |
| 7,149,792 B1 | 12/2006 | Hansen et al. |
| 7,178,149 B2 | 2/2007 | Hansen |
| 7,185,014 B1 | 2/2007 | Hansen |
| 7,250,862 B2 | 7/2007 | Bornhoevd et al. |
| 7,254,601 B2 | 8/2007 | Baller et al. |
| 7,269,732 B2 | 9/2007 | Kilian-Kehr |
| 7,341,197 B2 | 3/2008 | Muehl et al. |
| 7,380,236 B2 | 5/2008 | Hawley |
| 7,496,911 B2 | 2/2009 | Rowley et al. |
| 7,529,570 B2 | 5/2009 | Shirota |
| 7,529,750 B2 | 5/2009 | Bair |
| 7,536,673 B2 | 5/2009 | Brendle et al. |
| 7,555,355 B2 | 6/2009 | Meyer |
| 7,566,005 B2 | 7/2009 | Heusermann et al. |
| 7,570,755 B2 | 8/2009 | Williams et al. |
| 7,587,251 B2 | 9/2009 | Hopsecger |
| 7,591,006 B2 | 9/2009 | Werner |
| 7,593,917 B2 | 9/2009 | Werner |
| 7,613,290 B2 | 11/2009 | Williams et al. |
| 7,616,642 B2 | 11/2009 | Anke et al. |
| 7,617,198 B2 | 11/2009 | Durvasula |
| 7,624,092 B2 | 11/2009 | Lieske et al. |
| 7,624,371 B2 | 11/2009 | Kulkarni et al. |
| 7,644,120 B2 | 1/2010 | Todorov et al. |
| 7,644,129 B2 | 1/2010 | Videlov |
| 7,647,407 B2 | 1/2010 | Omshehe et al. |
| 7,650,607 B2 | 1/2010 | Resnick et al. |
| 7,653,902 B2 | 1/2010 | Bozak et al. |
| 7,673,141 B2 | 3/2010 | Kilian-Kehr et al. |
| 7,684,621 B2 | 3/2010 | Tunney |
| 7,703,024 B2 | 4/2010 | Kautzleben et al. |
| 7,707,550 B2 | 4/2010 | Resnick et al. |
| 7,725,815 B2 | 5/2010 | Peters |
| 7,728,838 B2 | 6/2010 | Forney et al. |
| 7,730,498 B2 | 6/2010 | Resnick et al. |
| 7,743,015 B2 | 6/2010 | Schmitt |
| 7,743,155 B2 | 6/2010 | Pisharody et al. |
| 7,752,335 B2 | 7/2010 | Boxenhorn |
| 7,757,234 B2 | 7/2010 | Krebs |
| 7,761,354 B2 | 7/2010 | Kling et al. |
| 7,774,369 B2 | 8/2010 | Herzog et al. |
| 7,779,089 B2 | 8/2010 | Hessmer et al. |
| 7,779,383 B2 | 8/2010 | Bornhoevd et al. |
| 7,783,984 B2 | 8/2010 | Roediger et al. |
| 7,802,238 B2 | 9/2010 | Clinton |
| 7,814,044 B2 | 10/2010 | Schwerk |
| 7,814,208 B2 | 10/2010 | Stephenson et al. |
| 7,817,039 B2 | 10/2010 | Bornhoevd et al. |
| 7,827,169 B2 | 11/2010 | Enenkiel |
| 7,831,600 B2 | 11/2010 | Kilian |
| 7,840,701 B2 | 11/2010 | Hsu et al. |
| 7,852,861 B2 | 12/2010 | Wu et al. |
| 7,853,241 B1 | 12/2010 | Harrison |
| 7,853,924 B2 | 12/2010 | Curran |
| 7,860,968 B2 | 12/2010 | Bornhoevd et al. |
| 7,865,442 B1 | 1/2011 | Sowell |
| 7,865,731 B2 | 1/2011 | Kilian-Kehr |
| 7,865,939 B2 | 1/2011 | Schuster |
| 7,873,666 B2 | 1/2011 | Sauermann |
| 7,882,148 B2 | 2/2011 | Werner et al. |
| 7,886,278 B2 | 2/2011 | Stulski |
| 7,890,388 B2 | 2/2011 | Mariotti |
| 7,890,568 B2 | 2/2011 | Belenki |
| 7,895,115 B2 | 2/2011 | Bayyapu et al. |
| 7,899,777 B2 | 3/2011 | Baier et al. |
| 7,899,803 B2 | 3/2011 | Cotter et al. |
| 7,908,278 B2 | 3/2011 | Akkiraju et al. |
| 7,917,629 B2 | 3/2011 | Werner |
| 7,921,137 B2 | 4/2011 | Lieske et al. |
| 7,921,686 B2 | 4/2011 | Bagepalli et al. |
| 7,925,979 B2 | 4/2011 | Forney et al. |
| 7,937,370 B2 | 5/2011 | Hansen |
| 7,937,408 B2 | 5/2011 | Stuhec |
| 7,945,691 B2 | 5/2011 | Dharamshi |
| 7,953,219 B2 | 5/2011 | Freedman et al. |
| 7,954,107 B2 | 5/2011 | Mao et al. |
| 7,954,115 B2 | 5/2011 | Gisolfi |
| 7,966,418 B2 | 6/2011 | Shedrinsky |
| 7,975,024 B2 | 7/2011 | Nudler |
| 7,987,176 B2 | 7/2011 | Latzina et al. |
| 7,987,193 B2 | 7/2011 | Ganapam et al. |
| 7,992,200 B2 | 8/2011 | Kuehr-McLaren et al. |
| 8,000,991 B2 | 8/2011 | Montagut |
| 8,005,879 B2 | 8/2011 | Bornhoevd et al. |
| 8,024,218 B2 | 9/2011 | Kumar et al. |
| 8,024,743 B2 | 9/2011 | Werner |
| 8,051,045 B2 | 11/2011 | Vogler |
| 8,055,758 B2 | 11/2011 | Hansen |
| 8,055,787 B2 | 11/2011 | Victor et al. |
| 8,060,886 B2 | 11/2011 | Hansen |
| 8,065,397 B2 | 11/2011 | Taylor et al. |
| 8,069,362 B2 | 11/2011 | Gebhart et al. |
| 8,073,331 B1 | 12/2011 | Mazed |
| 8,074,215 B2 | 12/2011 | Cohen et al. |
| 8,081,584 B2 | 12/2011 | Thibault et al. |
| 8,082,322 B1 | 12/2011 | Pascarella et al. |
| 8,090,452 B2 | 1/2012 | Johnson et al. |
| 8,090,552 B2 | 1/2012 | Henry et al. |
| 8,095,632 B2 | 1/2012 | Hessmer et al. |
| 8,108,543 B2 | 1/2012 | Hansen |
| 8,126,903 B2 | 2/2012 | Lehmann et al. |
| 8,127,237 B2 | 2/2012 | Beringer |
| 8,131,694 B2 | 3/2012 | Bender et al. |

(56) References Cited

U.S. PATENT DOCUMENTS

| | | |
|---|---|---|
| 8,131,838 B2 | 3/2012 | Bornhoevd et al. |
| 8,136,034 B2 | 3/2012 | Stanton et al. |
| 8,145,468 B2 | 3/2012 | Fritzsche et al. |
| 8,145,681 B2 | 3/2012 | Macaleer et al. |
| 8,151,257 B2 | 4/2012 | Zachmann |
| 8,156,117 B2 | 4/2012 | Krylov et al. |
| 8,156,208 B2 | 4/2012 | Bornhoevd et al. |
| 8,156,473 B2 | 4/2012 | Heidasch |
| 8,183,995 B2 | 5/2012 | Wang et al. |
| 8,190,708 B1 | 5/2012 | Short et al. |
| 8,229,944 B2 | 7/2012 | Latzina et al. |
| 8,230,333 B2 | 7/2012 | Decherd et al. |
| 8,249,906 B2 | 8/2012 | Ponce de Leon |
| 8,250,169 B2 | 8/2012 | Beringer et al. |
| 8,254,249 B2 | 8/2012 | Wen et al. |
| 8,261,193 B1 | 9/2012 | Alur et al. |
| 8,271,935 B2 | 9/2012 | Lewis |
| 8,280,009 B2 | 10/2012 | Stepanian |
| 8,284,033 B2 | 10/2012 | Moran |
| 8,285,807 B2 | 10/2012 | Slavin et al. |
| 8,291,039 B2 | 10/2012 | Shedrinsky |
| 8,291,475 B2 | 10/2012 | Jackson et al. |
| 8,296,198 B2 | 10/2012 | Bhatt et al. |
| 8,296,266 B2 | 10/2012 | Lehmann et al. |
| 8,296,413 B2 | 10/2012 | Bornhoevd et al. |
| 8,301,770 B2 | 10/2012 | van Coppenolle et al. |
| 8,306,635 B2 | 11/2012 | Pryor |
| 8,312,383 B2 | 11/2012 | Gilfix |
| 8,321,790 B2 | 11/2012 | Sherrill et al. |
| 8,321,792 B1 | 11/2012 | Alur et al. |
| 8,331,855 B2 | 12/2012 | Williams et al. |
| 8,346,520 B2 | 1/2013 | Lu et al. |
| 8,359,116 B2 | 1/2013 | Manthey |
| 8,364,300 B2 | 1/2013 | Pouyez et al. |
| 8,370,479 B2 | 2/2013 | Hart et al. |
| 8,370,826 B2 | 2/2013 | Johnson et al. |
| 8,375,292 B2 | 2/2013 | Coffman et al. |
| 8,375,362 B1 | 2/2013 | Brette et al. |
| 8,392,116 B2 | 3/2013 | Lehmann et al. |
| 8,392,561 B1 | 3/2013 | Dyer et al. |
| 8,396,929 B2 | 3/2013 | Helfman et al. |
| 8,397,056 B1 | 3/2013 | Malks et al. |
| 8,406,119 B2 | 3/2013 | Taylor et al. |
| 8,412,579 B2 | 4/2013 | Gonzalez |
| 8,417,764 B2 | 4/2013 | Fletcher et al. |
| 8,417,854 B2 | 4/2013 | Weng et al. |
| 8,423,418 B2 | 4/2013 | Hald et al. |
| 8,424,058 B2 | 4/2013 | Vinogradov et al. |
| 8,433,664 B2 | 4/2013 | Ziegler et al. |
| 8,433,815 B2 | 4/2013 | van Coppenolle et al. |
| 8,438,132 B1 | 5/2013 | Dziuk et al. |
| 8,442,933 B2 | 5/2013 | Baier et al. |
| 8,442,999 B2 | 5/2013 | Gorelik et al. |
| 8,443,069 B2 | 5/2013 | Bagepalli et al. |
| 8,443,071 B2 | 5/2013 | Lu et al. |
| 8,457,996 B2 | 6/2013 | Winkler et al. |
| 8,458,189 B1 | 6/2013 | Ludwig et al. |
| 8,458,315 B2 | 6/2013 | Miche et al. |
| 8,458,596 B1 | 6/2013 | Malks et al. |
| 8,458,600 B2 | 6/2013 | Dheap et al. |
| 8,473,317 B2 | 6/2013 | Santoso et al. |
| 8,478,861 B2 | 7/2013 | Taylor et al. |
| 8,484,156 B2 | 7/2013 | Hancsarik et al. |
| 8,489,527 B2 | 7/2013 | van Coppenolle et al. |
| 8,490,047 B2 | 7/2013 | Petschnigg et al. |
| 8,490,876 B2 | 7/2013 | Tan et al. |
| 8,495,072 B1 | 7/2013 | Kapoor et al. |
| 8,495,511 B2 | 7/2013 | Redpath |
| 8,495,683 B2 | 7/2013 | van Coppenolle et al. |
| 8,516,296 B2 | 8/2013 | Mendu |
| 8,516,383 B2 | 8/2013 | Bryant et al. |
| 8,521,621 B1 | 8/2013 | Hetzer et al. |
| 8,522,217 B2 | 8/2013 | Dutta et al. |
| 8,522,341 B2 | 8/2013 | Nochta et al. |
| 8,532,008 B2 | 9/2013 | Das et al. |
| 8,533,660 B2 | 9/2013 | Mehr et al. |
| 8,538,799 B2 | 9/2013 | Haller et al. |
| 8,543,568 B2 | 9/2013 | Wagenblatt |
| 8,547,838 B2 | 10/2013 | Lee et al. |
| 8,549,157 B2 | 10/2013 | Schnellbaecher |
| 8,555,248 B2 | 10/2013 | Brunswig et al. |
| 8,560,636 B2 | 10/2013 | Kieselbach |
| 8,560,713 B2 | 10/2013 | Moreira Sa de Souza et al. |
| 8,566,193 B2 | 10/2013 | Singh et al. |
| 8,571,908 B2 | 10/2013 | Li et al. |
| 8,572,107 B2 | 10/2013 | Fan et al. |
| 8,577,904 B2 | 11/2013 | Marston |
| 8,578,059 B2 | 11/2013 | Odayappan et al. |
| 8,578,328 B2 | 11/2013 | Kamiyama et al. |
| 8,578,330 B2 | 11/2013 | Dreiling et al. |
| 8,584,082 B2 | 11/2013 | Baird et al. |
| 8,588,765 B1 | 11/2013 | Harrison |
| 8,594,023 B2 | 11/2013 | He et al. |
| 8,635,254 B2 | 1/2014 | Harvey et al. |
| 8,689,181 B2 | 4/2014 | Biron, III |
| 8,752,074 B2 | 6/2014 | Hansen |
| 8,762,497 B2 | 6/2014 | Hansen |
| 8,769,095 B2 | 7/2014 | Hart et al. |
| 8,788,632 B2 | 7/2014 | Taylor et al. |
| 8,898,294 B2 | 11/2014 | Hansen |
| 9,002,980 B2 | 4/2015 | Shedrinsky |
| 2002/0099454 A1 | 7/2002 | Gerrity |
| 2002/0138596 A1 | 9/2002 | Darwin et al. |
| 2003/0093710 A1 | 5/2003 | Hashimoto et al. |
| 2003/0117280 A1 | 6/2003 | Prehn |
| 2004/0027376 A1 | 2/2004 | Calder et al. |
| 2004/0133635 A1 | 7/2004 | Spriestersbach et al. |
| 2004/0158455 A1 | 8/2004 | Spivack et al. |
| 2004/0158629 A1 | 8/2004 | Herbeck et al. |
| 2004/0177124 A1 | 9/2004 | Hansen |
| 2005/0015369 A1 | 1/2005 | Styles et al. |
| 2005/0021506 A1 | 1/2005 | Sauermann et al. |
| 2005/0027675 A1 | 2/2005 | Schmitt et al. |
| 2005/0060186 A1 | 3/2005 | Blowers et al. |
| 2005/0102362 A1 | 5/2005 | Price et al. |
| 2005/0198137 A1 | 9/2005 | Pavlik et al. |
| 2005/0213563 A1 | 9/2005 | Shaffer et al. |
| 2005/0240427 A1 | 10/2005 | Crichlow |
| 2005/0289154 A1 | 12/2005 | Weiss et al. |
| 2006/0053123 A1* | 3/2006 | Ide .............. G06F 17/30705 |
| 2006/0186986 A1 | 8/2006 | Ma et al. |
| 2006/0208871 A1 | 9/2006 | Hansen |
| 2007/0005736 A1 | 1/2007 | Hansen et al. |
| 2007/0016557 A1 | 1/2007 | Moore et al. |
| 2007/0027854 A1 | 2/2007 | Rao et al. |
| 2007/0027914 A1 | 2/2007 | Agiwal |
| 2007/0162486 A1 | 7/2007 | Brueggemann et al. |
| 2007/0174158 A1 | 7/2007 | Bredehoeft et al. |
| 2007/0260593 A1 | 11/2007 | Delvat |
| 2007/0266384 A1 | 11/2007 | Labrou et al. |
| 2007/0300172 A1 | 12/2007 | Runge et al. |
| 2008/0086451 A1 | 4/2008 | Torres et al. |
| 2008/0098085 A1 | 4/2008 | Krane et al. |
| 2008/0172632 A1 | 7/2008 | Stambaugh |
| 2008/0208890 A1* | 8/2008 | Milam ..................... 707/102 |
| 2008/0222599 A1 | 9/2008 | Nathan et al. |
| 2008/0231414 A1 | 9/2008 | Canosa |
| 2008/0244594 A1 | 10/2008 | Chen et al. |
| 2008/0255782 A1 | 10/2008 | Bilac et al. |
| 2008/0319947 A1 | 12/2008 | Latzina et al. |
| 2009/0006391 A1 | 1/2009 | Ram |
| 2009/0150431 A1 | 6/2009 | Schmidt et al. |
| 2009/0193148 A1 | 7/2009 | Jung et al. |
| 2009/0259442 A1 | 10/2009 | Gandikota et al. |
| 2009/0265760 A1 | 10/2009 | Zhu et al. |
| 2009/0299990 A1 | 12/2009 | Setlur et al. |
| 2009/0300060 A1 | 12/2009 | Beringer et al. |
| 2009/0300417 A1* | 12/2009 | Bonissone ......... G05B 23/0254 714/26 |
| 2009/0319518 A1 | 12/2009 | Koudas et al. |
| 2009/0327337 A1 | 12/2009 | Lee et al. |
| 2010/0017379 A1 | 1/2010 | Naibo et al. |
| 2010/0017419 A1* | 1/2010 | Francis ............... G06Q 10/06 705/1.1 |

(56) References Cited

U.S. PATENT DOCUMENTS

| | | |
|---|---|---|
| 2010/0064277 A1 | 3/2010 | Baird et al. |
| 2010/0077001 A1 | 3/2010 | Vogel et al. |
| 2010/0094843 A1 | 4/2010 | Cras |
| 2010/0125584 A1 | 5/2010 | Navas |
| 2010/0125826 A1 | 5/2010 | Rice et al. |
| 2010/0250440 A1 | 9/2010 | Wang et al. |
| 2010/0257242 A1 | 10/2010 | Morris |
| 2010/0286937 A1 | 11/2010 | Hedley et al. |
| 2010/0287075 A1 | 11/2010 | Herzog et al. |
| 2010/0293360 A1 | 11/2010 | Schoop et al. |
| 2010/0325132 A1* | 12/2010 | Liu .............. G06F 17/30516 707/759 |
| 2011/0035188 A1* | 2/2011 | Martinez-Heras et al. ... 702/189 |
| 2011/0078599 A1 | 3/2011 | Guertler et al. |
| 2011/0078600 A1 | 3/2011 | Guertler et al. |
| 2011/0099190 A1 | 4/2011 | Kreibe |
| 2011/0137883 A1 | 6/2011 | Lagad et al. |
| 2011/0138354 A1 | 6/2011 | Hertenstein et al. |
| 2011/0145712 A1 | 6/2011 | Pontier et al. |
| 2011/0145933 A1 | 6/2011 | Gambhir et al. |
| 2011/0153505 A1 | 6/2011 | Brunswig et al. |
| 2011/0154226 A1 | 6/2011 | Guertler et al. |
| 2011/0161409 A1 | 6/2011 | Nair et al. |
| 2011/0173203 A1 | 7/2011 | Jung et al. |
| 2011/0173220 A1 | 7/2011 | Jung et al. |
| 2011/0173264 A1 | 7/2011 | Kelly |
| 2011/0208788 A1 | 8/2011 | Heller et al. |
| 2011/0209069 A1 | 8/2011 | Mohler |
| 2011/0219327 A1* | 9/2011 | Middleton, Jr. .... G05B 23/0272 715/772 |
| 2011/0231592 A1 | 9/2011 | Bleier et al. |
| 2011/0276360 A1 | 11/2011 | Barth et al. |
| 2011/0307295 A1 | 12/2011 | Steiert et al. |
| 2011/0307363 A1 | 12/2011 | N et al. |
| 2011/0307405 A1 | 12/2011 | Hammer et al. |
| 2011/0320525 A1 | 12/2011 | Agarwal et al. |
| 2012/0005577 A1 | 1/2012 | Chakra et al. |
| 2012/0059856 A1 | 3/2012 | Kreibe et al. |
| 2012/0072435 A1 | 3/2012 | Han |
| 2012/0072885 A1 | 3/2012 | Taragin et al. |
| 2012/0078959 A1 | 3/2012 | Cho et al. |
| 2012/0096429 A1 | 4/2012 | Desai et al. |
| 2012/0117051 A1 | 5/2012 | Liu et al. |
| 2012/0131473 A1 | 5/2012 | Biron, III |
| 2012/0136649 A1 | 5/2012 | Freising et al. |
| 2012/0143970 A1 | 6/2012 | Hansen |
| 2012/0144370 A1 | 6/2012 | Kemmler et al. |
| 2012/0150859 A1 | 6/2012 | Hu |
| 2012/0158914 A1 | 6/2012 | Hansen |
| 2012/0166319 A1 | 6/2012 | Deledda et al. |
| 2012/0167006 A1 | 6/2012 | Tillert et al. |
| 2012/0173671 A1 | 7/2012 | Callaghan et al. |
| 2012/0197488 A1 | 8/2012 | Lee et al. |
| 2012/0197852 A1 | 8/2012 | Dutta et al. |
| 2012/0197856 A1 | 8/2012 | Banka et al. |
| 2012/0197898 A1 | 8/2012 | Pandey et al. |
| 2012/0197911 A1 | 8/2012 | Banka et al. |
| 2012/0239381 A1 | 9/2012 | Heidasch |
| 2012/0239606 A1 | 9/2012 | Heidasch |
| 2012/0254825 A1 | 10/2012 | Sharma et al. |
| 2012/0259932 A1 | 10/2012 | Kang et al. |
| 2012/0284259 A1 | 11/2012 | Jehuda |
| 2012/0311501 A1 | 12/2012 | Nonez et al. |
| 2012/0311526 A1 | 12/2012 | DeAnna et al. |
| 2012/0311547 A1 | 12/2012 | DeAnna et al. |
| 2012/0324066 A1 | 12/2012 | Alam et al. |
| 2013/0006400 A1 | 1/2013 | Caceres et al. |
| 2013/0036137 A1 | 2/2013 | Ollis et al. |
| 2013/0054563 A1 | 2/2013 | Heidasch |
| 2013/0060791 A1 | 3/2013 | Szalwinski et al. |
| 2013/0067031 A1 | 3/2013 | Shedrinsky |
| 2013/0067302 A1 | 3/2013 | Chen et al. |
| 2013/0073969 A1 | 3/2013 | Blank et al. |
| 2013/0080898 A1 | 3/2013 | Lavian et al. |
| 2013/0110496 A1 | 5/2013 | Heidasch |
| 2013/0110861 A1 | 5/2013 | Roy et al. |
| 2013/0124505 A1 | 5/2013 | Bullotta et al. |
| 2013/0124616 A1 | 5/2013 | Bullotta et al. |
| 2013/0125053 A1 | 5/2013 | Brunswig et al. |
| 2013/0132385 A1 | 5/2013 | Bullotta et al. |
| 2013/0166563 A1 | 6/2013 | Mueller et al. |
| 2013/0166569 A1 | 6/2013 | Navas |
| 2013/0173062 A1 | 7/2013 | Koenig-Richardson |
| 2013/0179565 A1 | 7/2013 | Hart et al. |
| 2013/0185593 A1 | 7/2013 | Taylor et al. |
| 2013/0185786 A1 | 7/2013 | Dyer et al. |
| 2013/0191767 A1 | 7/2013 | Peters et al. |
| 2013/0207980 A1 | 8/2013 | Ankisettipalli et al. |
| 2013/0211555 A1 | 8/2013 | Lawson et al. |
| 2013/0246897 A1 | 9/2013 | O'Donnell |
| 2013/0262641 A1 | 10/2013 | Zur et al. |
| 2013/0275344 A1 | 10/2013 | Heidasch |
| 2013/0275550 A1 | 10/2013 | Lee et al. |
| 2013/0304581 A1 | 11/2013 | Soroca et al. |
| 2014/0019432 A1 | 1/2014 | Lunenfeld |
| 2014/0282370 A1 | 9/2014 | Schaefer et al. |

FOREIGN PATENT DOCUMENTS

| | | |
|---|---|---|
| WO | WO-99/21152 A1 | 4/1999 |
| WO | WO-00/77592 A2 | 12/2000 |
| WO | WO-2008/115995 A1 | 9/2008 |
| WO | WO-2014/145084 A1 | 9/2014 |

OTHER PUBLICATIONS

Hart Server, retrieved from 2001 internet archive of hartcomm.org http://www.hartcomm.org/server2/index.html, 13 pages (2001).

Ray, Erik T., Learning XML, First Edition, 277 pages (2001).

* cited by examiner

METHOD FOR ANALYZING TIME SERIES ACTIVITY STREAMS AND DEVICES THEREOF

This application is a continuation application and claims priority to and the benefit of U.S. patent application Ser. No. 13/678,809, filed Nov. 16, 2012, issued as U.S. Pat. No. 8,909,641 and claiming the benefit of U.S. Provisional Patent Application Ser. No. 61/560,390 filed Nov. 16, 2011. The contents of each of these applications are hereby incorporated by reference herein in their entireties.

FIELD

This technology generally relates to method for analyzing data and particularly relates to analyzing time series activity streams and devices thereof.

BACKGROUND

The connected world, also referred to as the internet of things, is growing quickly. Analysts have estimated that along with the continued growth of humans using the Internet, the number of connected devices and systems will rise from five billion to one trillion in the next ten years. However, the traditional ways to manage and communicate with these systems has not changed. In other words, all the information from these systems is not accessible or is not able to be correlated in a way that helps people or businesses do their jobs better and more efficiently, find information they are looking for in the proper context, or make this data consumable in a meaningful way.

There are a variety of specific solutions to handle the rising amount of data found in industry today. These solutions can be categorized into the following types of systems: Enterprise Resource Planning (ERP) systems; Portals and related technology systems; Traditional Business Intelligence systems; and Manufacturing Intelligence systems.

Enterprise Resource Planning systems are used by large and small companies to run their businesses. The typical minimal requirements for these systems are to provide financial and accounting services. However, these systems often have additional functionality for specific vertical industries, such as manufacturing, utilities, construction, and retail by way of example. These Enterprise Resource Planning systems are rigid, in both business process support and data models. They also are very expensive to implement and maintain. Further, these systems are usually implemented to enforce repeatable, standard business processes and it generally is not possible to use these systems for dynamic analysis of different types of data.

Traditional Business Intelligence systems usually rely on specific, detailed data models, such as data warehouses. While the data is typically current, for example about a day old, in these systems, the models are rigid and report writing may require Information Technology (IT) skills. While these systems have become much better at providing users with the ability to self-serve, the self service capability is restricted to the previously designed semantic search models. As a result, these Traditional Business Intelligence systems do not address current conditions, rapidly changing data, third party collaboration, or external data sources.

Manufacturing Intelligence systems (also referred to as Enterprise Manufacturing Intelligence or EMI) are typically concerned with real-time data collected from machines and devices. This time series data usually does not have any business context associated with it. The users of these Manufacturing Intelligence systems typically are plant operators and engineers. These systems do not handle other business related data, do not understand or correlate unstructured data, and are not easily readable.

Currently, most of the utilized solutions to pull all these separate systems with their different sources of data together so users can consume data from more than one of these solutions in a meaningful way, is to execute a complex, multi-year integration project that results in a data mart. Typically, this involves replicating large quantities of data from multiple systems into a rigid model, similar to a hub and spoke model. The hub is the data mart holding all the replicated data. As the systems changes at the end of the spokes, new time consuming integration and modeling is required. Unfortunately, this type of solution is expensive to maintain, the data model and semantics are not dynamic, and the ability to consume data is available only through pre-defined reports.

Other existing approaches to pull all these separate systems with their different sources of data together rely on relational data bases which are adept at answering known questions against known data structures (Known-Known) and can answer known questions against unknown data structures (Known-Unknown). Unfortunately, these existing approaches can not effectively answer unknown questions against known data structure (Unknown-Known), and unknown questions against unknown data structures (Unknown-Unknown).

As a result, currently users of existing technologies to identify and access data are concerned with the timeliness and relevance of acquired data. In particular, there is a concern about deficiencies with accurately identifying and accessing real-time data from devices and other storage systems. Additionally, these existing technologies have difficulties identifying and accessing different types of relevant data, such as business related data which can be stored in many varying formats and unstructured data. Further, these existing technologies typically require large quantities of data from multiple systems to first be entered into a rigid model and then this entered data can only be access in limited manners.

SUMMARY

A method for analyzing a time series activity stream including a data management computing apparatus for retrieving a time series data of a monitored asset based on one or more tags in response to a request. Further, a heterogeneous data based on the one or more tags is retrieved by the data management computing apparatus. Furthermore, a cause of an anomaly period in retrieved time series data of the monitored asset is determined based on the retrieved heterogeneous data by the data management computing apparatus. Finally, the determined cause of the anomaly period in the time series data in the monitored asset is provided by the data management computing apparatus.

A non-transitory computer readable medium having stored thereon instructions for analyzing a time series activity stream comprising machine executable code which when executed by at least one processor, causes the processor to perform steps including retrieving a time series data of a monitored asset based on one or more tags in response to a request. Further, a heterogeneous data based on the one or more tags is retrieved. Furthermore, a cause of an anomaly period in retrieved time series data of the monitored asset is determined based on the retrieved heterogeneous data. Finally, the determined cause of the anomaly period in the time series data in the monitored asset is provided.

A data management computing apparatus comprising one or more processors, a memory coupled to the one or more processors which are configured to execute programmed instructions stored in the memory including retrieving a time series data of a monitored asset based on one or more tags in response to a request. Further, a heterogeneous data based on the one or more tags is retrieved. Furthermore, a cause of an anomaly period in retrieved time series data of the monitored asset is determined based on the retrieved heterogeneous data. Finally, the determined cause of the anomaly period in the time series data in the monitored asset is provided.

This technology provides a number of advantages including providing more effective and efficient methods, non-transitory computer readable medium and device for analyzing time series data. With this technology, a wide variety of different types of data, such as business related data, social media data and unstructured data, can be easily identified and accessed. Further, this technology does not require the data to be first loaded into a rigid model which can only be accessed in limited manners.

DETAILED DESCRIPTION

Figure 1:
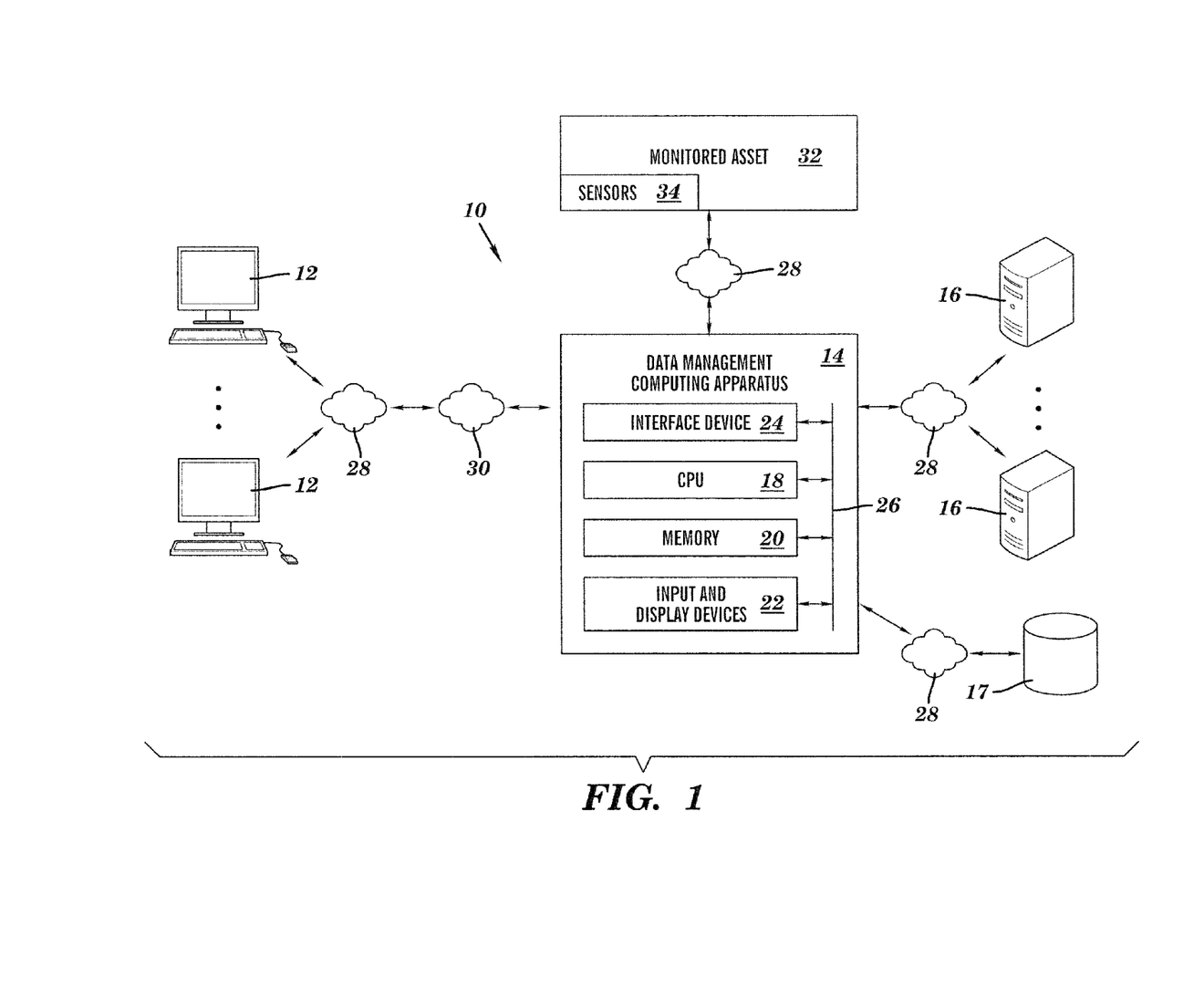
FIG. 1 is a block diagram of an environment with an exemplary data management computing apparatus for analyzing time series activity steam.

An exemplary environment 10 with a data management computing apparatus 14 that analyzes time series data is illustrated in FIG. 1. In this particular example, the environment 10 includes the data management computing device 14, plurality client computing devices 12, and a plurality of data servers 16, a social network database 17, monitored asset 32 and sensors 34 which are coupled together by the Local Area Network (LAN) 28 and Wide Area Network (WAN) 30, although the environment 10 can include other types and numbers of devices, components, elements and communication networks in other topologies and deployments. While not shown, the exemplary environment 10 may include additional components, such as routers, switches and other devices which are well known to those of ordinary skill in the art and thus will not be described here. This technology provides a number of advantages including providing more effective and efficient methods, non-transitory computer readable medium and device for analyzing time series data.

Referring more specifically to FIG. 1, the data management computing apparatus 14 provides a number of functions analyzing time series data, although other numbers and types of systems can be used and other numbers and types of functions can be performed. The data management computing apparatus 14 includes at least one processor 18, memory 20, input and display devices 22, and interface device 24 which are coupled together by bus 26, although data management computing apparatus 14 may comprise other types and numbers of elements in other configurations.

Processor(s) 18 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 2:
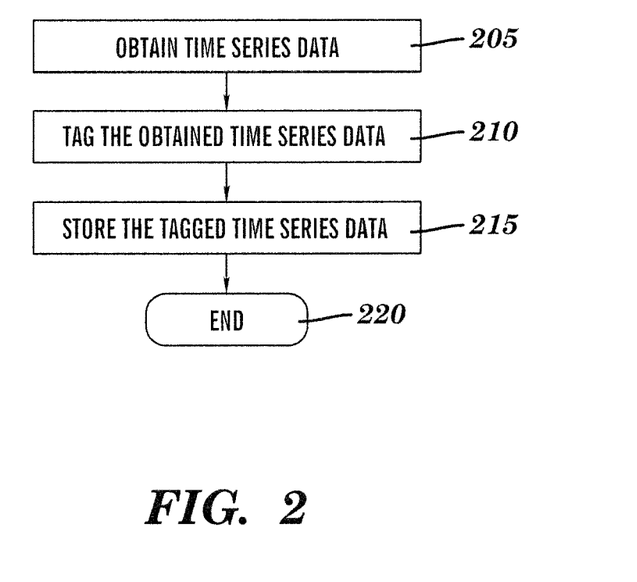
FIG. 2 is a flowchart of an exemplary method for obtaining and tagging time series data.
Figure 3A:
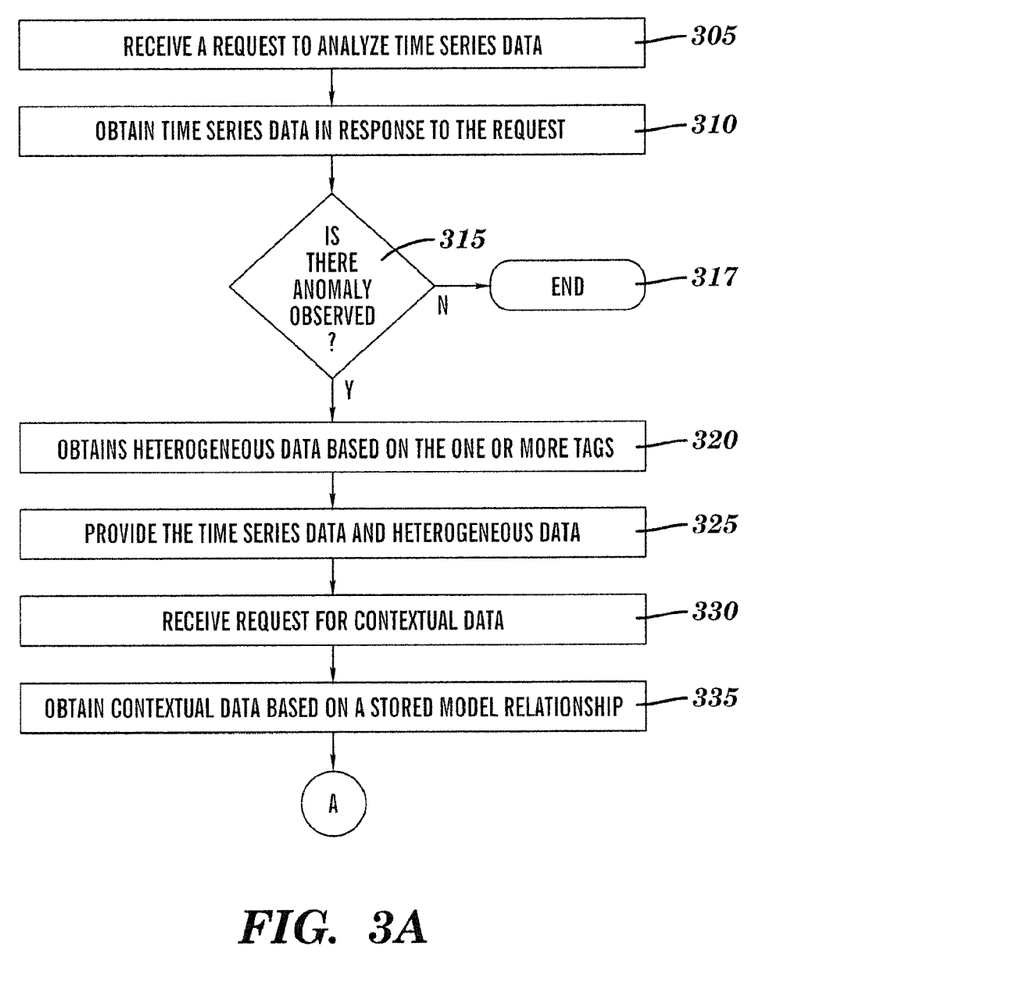
FIGS. 3A-3B are flowcharts of an exemplary method for analyzing time series activity steam.
Figure 3B:
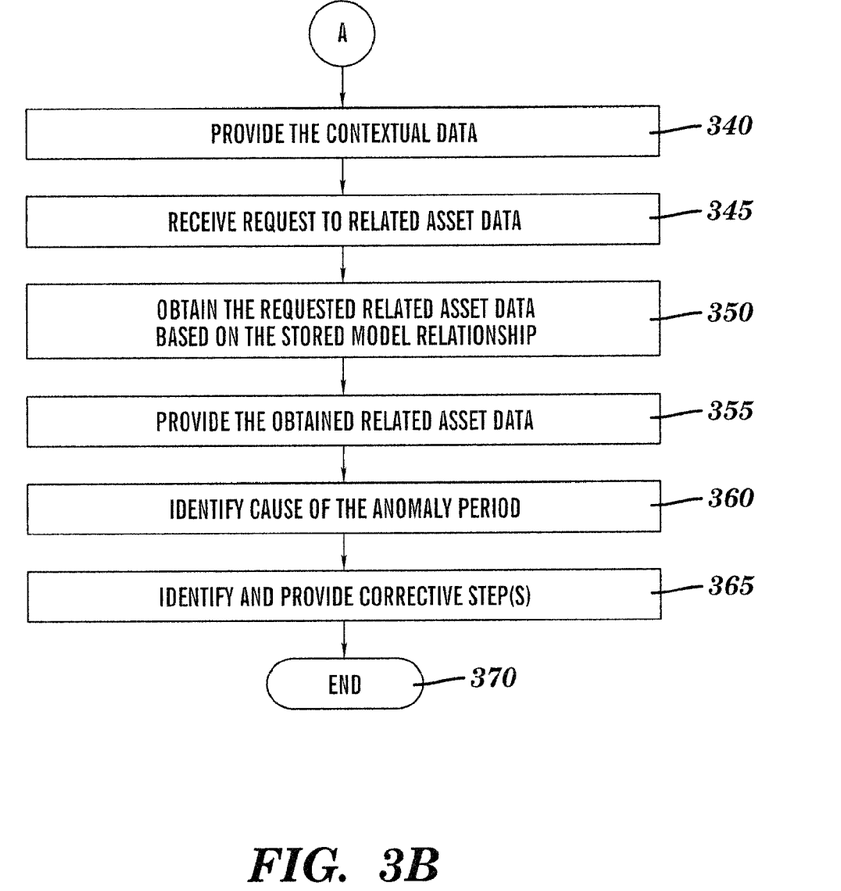
Figure 4:
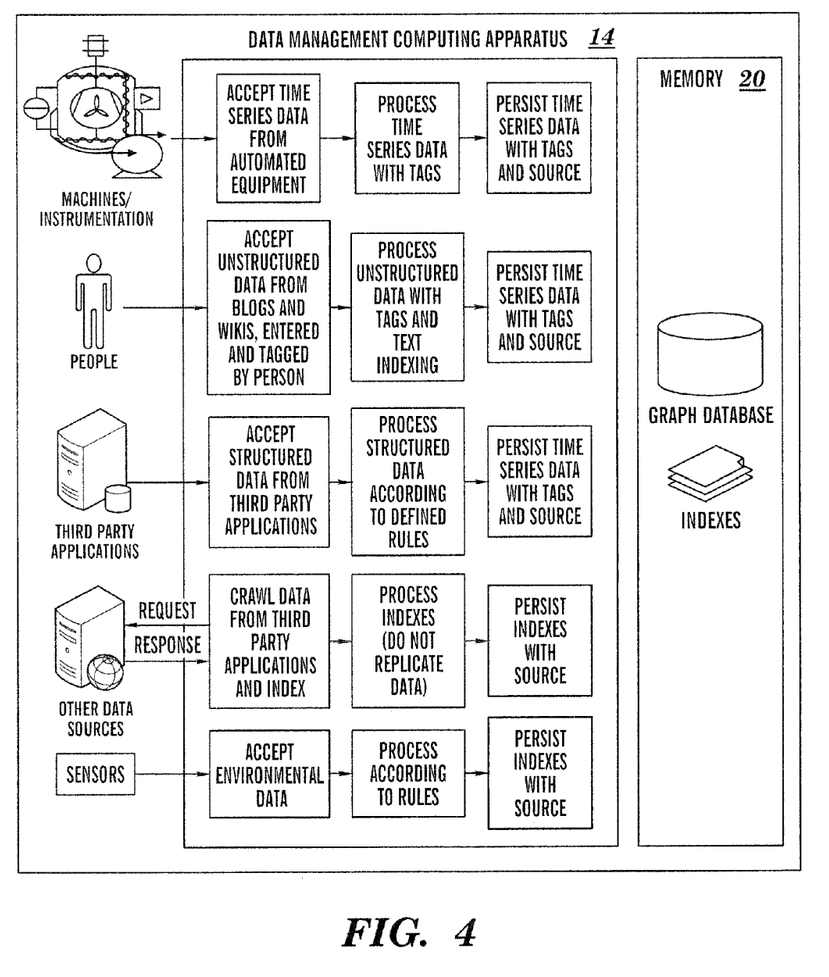
FIG. 4 is an exemplary diagram of a method for obtaining and tagging heterogeneous data from multiple sources.
Figure 5:
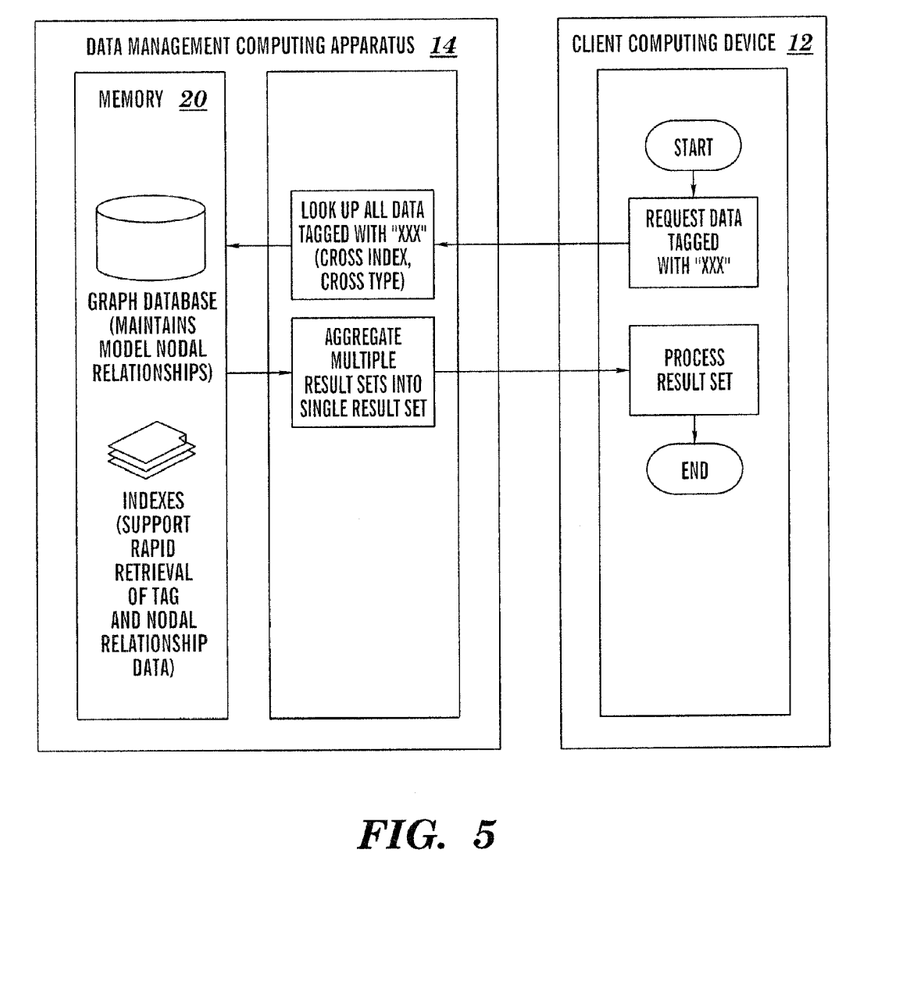
FIG. 5 is an exemplary illustration of a method for servicing the request from a client computing device.

Memory 20 may comprise one or more tangible storage media, such as RAM, ROM, flash memory, CD-ROM, floppy disk, hard disk drive(s), solid state memory, DVD, or other memory storage types or devices, including combinations thereof, which are known to those of ordinary skill in the art. Memory 20 may store one or more non-transitory computer-readable instructions of this technology as illustrated and described with reference to the examples herein that may be executed by the one or more processor(s) 18. The flow chart shown in FIGS. 2 and 3A-3B is representative of example steps or actions of this technology that may be embodied or expressed as one or more non-transitory computer or machine readable instructions stored in memory 20 that may be executed by the processor(s) 18. Additionally, as illustrated in FIG. 4-5, the memory 20 includes a graph database to which maintains the model relationship and indexes which support rapid retrieval of tag and nodal relationship data.

Input and display devices 22 enable a user, such as an administrator, to interact with the data management computing apparatus 14, such as to input and/or view data and/or to configure, program and/or operate it by way of example only. Input devices may include a touch screen, keyboard and/or a computer mouse and display devices may include a computer monitor, although other types and numbers of input devices and display devices could be used. Additionally, the input and display devices 22 can be used by the user, such as an administrator to develop applications using an application interface.

The interface device 24 in the data management computing apparatus 14 is used to operatively couple and communicate between the data management computing apparatus 14, the client computing devices 12, and the plurality of data servers 16 which are all coupled together by LAN 28 and WAN 30. By way of example only, the interface device 24 can use TCP/IP over Ethernet and industry-standard protocols, including NFS, CIFS, SOAP, XML, LDAP, and SNMP although other types and numbers of communication protocols can be used.

Each of the client computing devices 12 includes a central processing unit (CPU) or processor, a memory, an interface device, and an I/O system, which are coupled together by a bus or other link, although other numbers and types of network devices could be used. Each of the client computing devices 12 communicate with the data management computing apparatus 14 through LAN 28, although each of the client computing devices 12 can interact with the data management computing apparatus 14 in other manners.

Each of the plurality of data servers 16 includes a central processing unit (CPU) or processor, a memory, an interface device, and an I/O system, which are coupled together by a bus or other link, although other numbers and types of network devices could be used. Each of the plurality of data servers 16 enters, updates and/or store content, such as files and directories, although other numbers and types of functions can be implemented and other types and amounts of data could be entered, updated, or stored used. Each of the plurality of data servers 16 may include by way of example only, enterprise resource planning (ERP) systems, portals and related technologies, traditional business intelligence systems and manufacturing intelligence systems.

The social network database 17 includes a central processing unit (CPU) or processor, a memory, an interface device, and an I/O system, which are coupled together by a bus or other link, although other numbers and types of network devices could be used. The social network database 17 includes heterogeneous data entered by users from social network platforms, although the social network database 17 can include any additional information. By way of example only, the contents of the social network database 17 includes information from the users of Wikipedia, blogs which are entered and tagged by the users. As illustrated in FIG. 1, the data management computing apparatus 14 interacts with the social network database via LAN 28, although the data management computing apparatus 14 can interact with the social network database 17 via other network topologies.

The monitored asset 32 includes a central processing unit (CPU) or processor, a memory, an interface device, and an I/O system, which are coupled together by a bus or other link, although other numbers and types of network devices could be used. In this technology, the monitored asset 32 can be an electrical or mechanical devices, machines, or instruments. Additionally, the monitored asset 32 includes sensors 34 which assist with obtaining information from the monitored asset 32 or transmitting data out of the monitored asset 32. Although the sensors 34 has been illustrated in FIG. 1 to be coupled with the monitored asset, as it may be appreciated by a person having ordinary skill in the art, the sensors 34 can exist outside the monitored asset 34 and could be communicably coupled to the monitored asset 34. Further, the data management computing apparatus 14 interacts, obtains data or sends data to the monitored asset 32 or the sensors 34 via LAN 28, although the data management computing apparatus 14 can interact with the monitored asset 32 and the sensors 34 in other manners.

In this technology, sensor 34 is an electro-mechanical device which receives electrical data from the monitored asset 32 and converts the electrical signals to a format which can be read by an observer. By way of example only, sensor 34 can be a pressure sensor, thermal, heat, and/or temperature sensor, although other types and numbers of sensors and other monitors could be used. Accordingly, in this technology, sensors 34 are used by the data management computing apparatus 14 to obtain time series data from the monitored asset 32, although the data management computing apparatus 14 can use the sensors 34 for other additional functions.

Although an exemplary environment 10 with the plurality of client computing devices 12, the data management computing apparatus 14, the plurality of data servers 16, the social network database 17, the monitored asset 32 and sensors 34 are described and illustrated herein, other types and numbers of systems, devices in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only tele-traffic in any suitable form (e.g., voice and modem), wireless traffic media, wireless traffic networks, cellular traffic networks, 3G traffic networks, Public Switched Telephone Network (PSTNs), Packet Data Networks (PDNs), the Internet, intranets, and combinations thereof.

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for analyzing time series data will now be described with reference to FIGS. 1, 2 and 3A-3B. Particularly with respect to FIGS. 1 and 2, in step 205, the data management computing apparatus 14 receiving the time series data of the monitored asset 32 from the sensors 34 in real time as illustrated in the first step of FIG. 4, although the data management computing apparatus 14 can obtain the time series from the plurality of data servers 16. By way of example only, the time series data can include real time data of monitored asset 32, such as continuous temperature readings or pressure readings, although the time series data can relate to other readings. However, in another example, the data management computing apparatus 14 may periodically obtain the time series data from sensors 34. Additionally, in yet another example, the data management computing apparatus 14 can obtain the time series data in response to a notification received from the sensors 34 when there is an event triggered in the monitored asset 32.

Next, in step 210, the data management computing apparatus 14 embeds tags to the obtained time series obtained in step 105, although the data management computing apparatus 14 can use other techniques to quickly and efficiently identify the time series data. In this example, the data management computing apparatus 14 automatically embeds tags to the time series data based on pre-defined rules. As it would be appreciated by a person having ordinary skill in the art, a tag is a non-hierarchical keyword or term or a metadata assigned to a piece of information. The tag helps describe an item and allows it to be found again by browsing or searching. Additionally, tags are can be customized depending on the system and can be of various types, such as a dynamic tag which can be created by the data management computing apparatus 14 based on the obtained time series data or fixed tags which are created by the data management computing apparatus 14 based on pre-defined vocabulary. By way of example only, the pre-defined rules can relate to embedding tag for a particular type of data, such as embedding "temperature values" as tags for all the time series data obtained from the sensors 34 relating to the temperature values of the monitored asset 32 and/or add the name of the particular component as the tag for all the data obtained from the sensors for particular component of the monitored asset 32, such as "therometer1".

Optionally, the data management computing apparatus 14 can add metadata, such as the data source, the relationship of the source to the monitored asset 34 and additional context information to the obtained time series data.

In another example of the technology, the data management computing apparatus 14 can obtain the time series data from the sensors 34 and collectively create an activity stream. Additionally, the activity stream can be tagged using techniques illustrated in step 210 and store the activity stream within the memory 20.

In step 215, the data management computing apparatus 14 stores the tagged time series data in memory 20 as illustrated in FIG. 4, although the data management computing apparatus 14 can store the time series data at other memory locations. In this technology, the data management computing apparatus 14 stores the tagged time series data and in the memory 20 and the exact memory location of the tagged time series and the associated memory location is stored in the index table which is also present in the memory 20. By storing the tagged time series data and having an index table, the technology disclosed in this application provided benefits of rapid and accurate retrieval data.

Additionally, in this technology, the data management computing apparatus 14 stores the tagged time series in the memory 20 with time stamp. In this technology, time stamp relates to the information regarding the exact time and date the time series data was obtained in real-time from the sensors 34 and stored. By storing the heterogeneous data and the time series data with time stamp, the technology disclosed in this application provides benefits to further analyze the cause of an anomaly period accurately, although storing with the time stamp may provide other additional benefits.

In step 220, the process of obtaining and storing the time series data ends.

Next, in FIG. 3A, in step 305, the data management computing apparatus 14 receives a request to analyze time series data with a particular tag for a monitored asset 32 via an executing application in client computing device 12 as illustrated in FIG. 5, although the data management computing apparatus 14 may receive other types of requests from the client computing device 12.

In step 310, the data management computing apparatus 14 retrieves the stored time series data in step 115 of FIG. 2 associated with the received tag in response to the received request, although the data management computing apparatus 14 can obtain the stored time series data without using the received tag information. By way of example only, obtains the time series data stored in the step 215 from the memory 20 by referring to the index table and using the tag information present in the received request as illustrated in FIG. 5, although the data management computing apparatus 14 can directly obtain the heterogeneous contextual data from memory 20 without directly referring to the index table stored in memory 20 or without using the tag information received in the request for the time series data. By way of example only, the data management computing apparatus 14 uses the tag information received in the request for the time series data, matches the tag information with the listed tags in the index table and accordingly obtains the time series data from the memory location associated with the tag in the index table. As previously illustrated, the technology disclosed in this application provides advantages by to quickly and effectively obtain the requested data by referring to the index table. However, as illustrated earlier in another example, if the data management computing apparatus 14 obtains all the time series data present within the memory 20 when the data management computing apparatus 14 does not use the received tag to obtain the time series data stored in step 215.

In step 315, the data management computing apparatus 14 determines if there was an anomaly period within the time series data of the monitored asset. If the data management computing apparatus 14 determines there was no observed anomaly period within the time series data, then the No branch is taken to step 317 where the data management computing apparatus 14 provides the requesting client computing device 12 with the obtained time series data and the process flow ends. If the data management computing apparatus 14 determines there was an observed anomaly period within the time series data, then the Yes branch is taken to step 320.

In this example, the data management computing apparatus 14 determines when an anomaly period is observed within the time series data by comparing the time series data of the monitored asset 32 against threshold values for the monitored asset 22, although the data management computing apparatus 14 can determine when an anomaly period is observed in other manners well known to those of ordinary skill in the art, such as monitoring for readings in the time series data which are greater than a standard deviation by way of example.

In step 320, the data management computing apparatus 14 retrieves structured and/or unstructured heterogeneous data using the tag information received in step 305 from the multiple sources, such as plurality of data servers 16, social network database 17 or from sensors 34 as illustrated in FIG. 4 by way of example only, although the data management computing apparatus 14 can obtain structured or unstructured heterogeneous data from other sources. However, in another example, the data management computing apparatus 14 may obtain heterogeneous data associated with tags which are present in the anomaly period. In this technology, the data management computing apparatus 14 obtains the unstructured heterogeneous data relating to the received tag information by crawling to the plurality of data servers 16, although the data management computing apparatus 14 can obtain information relating to the tag information from other sources in other manners. In this technology, the structured or unstructured data relates to environmental data obtained from sensors 34 and business process information from one or more applications on one or more third party computing devices as illustrated in FIG. 4, although the contextual information can relate to other types and amounts of additional information obtained from other sources. For further illustrative purposes, the data management computing apparatus 14 obtains the user entered structured or unstructured data found in wikis, blogs or other social platforms from the social network database 17, although the data management computing apparatus 14 can obtain the user entered data from other sources.

In step 325, the data management computing apparatus 14 provides the obtained time series data and the heterogeneous time series data to the requesting client computing device 12. Additionally, in this technology, while providing the time series data and the heterogeneous data, the data management computing apparatus 14 converts the tagged time series data into a format convenient for viewing in the requesting client computing device 12. By way of example only, formats can be in a PDF, textual format, graphs, charts, tabular columns or an image format, although other formats can be used. Further, in this technology, the data management computing apparatus 14 provides the tagged time series data to the requesting client computing device 12 by embedding the converted time series data and the heterogeneous data within a work-flow of the executing application of the client computing device 12, although the data management computing apparatus 14 can provide the tagged time series data to the requesting client computing device 12 using other methods.

In step 330, the data management computing apparatus 14 receives a request from the client computing device 12 via the executing application for heterogeneous contextual data relating to the anomaly period, although the data management computing apparatus 14 may receive other types of request from the client computing device 12.

In step 335, the data management computing apparatus 14 retrieves the heterogeneous contextual data stored relating to the anomaly period from the plurality of data servers 16, social network database 17 or sensors 34 based on the model relationships in response to the received request, although the data management computing apparatus 14 can obtain the heterogeneous contextual data without a model relationship based on other parameters from other sources. In this technology, the model relationship defines the relationship, hierarchy, data or process flow, and/or interaction of the monitored asset 32 with other related assets. In this technology, the model relationship is present within the memory 20, although the model relationship can be stored at other locations. As it would appreciated by a person having ordinary skill in the art, heterogeneous contextual data in this technology relates to environmental data, such as temperature pressure, operator blog entries, customer order details, although heterogeneous contextual data can include other types and amounts of information.

In step 340, the data management computing apparatus 14 provides the obtained heterogeneous contextual data relating to the anomaly period to the requesting client computing device using techniques illustrated in step 325.

In step 345, the data management computing apparatus 14 receives a request for related heterogeneous asset data relating to the anomaly from the client computing device 12 via the executing application. Additionally, as illustrated in step 240, the data management computing apparatus 14 can receive keywords along with the request for the related heterogeneous asset data.

In step 350, the data management computing apparatus 14 retrieves the related heterogeneous asset data, such as upstream data and/or downstream data based on model relationships and also activities of the other machines associated during the anomaly period from the sensors 34, plurality of data servers 16 as illustrated in FIG. 4, although the data management computing apparatus 14 can obtain the related heterogeneous asset data from other sources in other manners. In this technology, upstream data includes data from related assets (not shown) upstream from the functionality performed by the monitored asset 32 and the downstream data includes data from related assets (not shown) downstream from the functionality performed by the monitored asset 32 during the anomaly period, although the obtained related heterogeneous asset data can also include the upstream and downstream data prior to the anomaly period. Additionally, in this technology, the data management computing apparatus 14 identifies the related assets which are upstream and downstream from the monitored asset based on the model relationship for the monitored asset 32 which explains the relationship hierarchy or flow between the monitored asset and related assets.

In step 355, the data management computing apparatus 14 provides the obtained related heterogeneous asset data to the requesting client computing device 12 using techniques illustrated in step 325.

Next, in step 360 the data management computing apparatus 14 identifies a cause of the anomaly period in the time series data from the monitored asset based on the time series data, the heterogeneous data, the heterogeneous contextual data, and the related heterogeneous asset data, although the data management computing apparatus 14 can determine the actual cause of anomaly using other techniques. In this technology, the time series, the heterogeneous data, the heterogeneous contextual data and the related heterogeneous asset data collectively provides an accurate cause of the anomaly period as one of the retrieved heterogeneous information independently may not provide the complete or accurate cause of the anomaly period.

Upon identifying the cause of anomaly, in step 365 the data management computing apparatus 14 identifies and provides corrective step(s) to the requesting client computing device 12 obtained by correlating the identified cause against a table of stored corrective step(s) to fix the cause of the anomaly period, although other manners identifying and providing corrective step(s) can be used. For example, the opinions from technical experts, suggestions from the manufacturer or comments present in blogs and other social media relating to the monitored asset mined from one or more of the plurality of data servers 16 and or the social network database 17 can be used. Additionally, the data management computing apparatus 14 may also direct the requesting client computing device 12 to a website or a technical expert who could further assist with preventing the anomaly period. In step 380, this exemplary method ends.

An example illustrating the methods for analyzing time series data is explained as follows. In this example, the data management computing apparatus 14 had captured the time series data of the electric car, such as car identification number, time started, time completed, level of charge to start, level of charge when completed from the sensors 34 when an electric car was being charged and stored the time series of the car using the date on which the car was charged and the name of the car within the memory 20.

The data management computing apparatus 14 computing apparatus 14 retrieves the stored time series data of the electric car using the tags of the date of charge and the name of the car.

Further, the data management computing apparatus 14 identifies anomaly in the obtained time series data, which in this case is the requirement for the car to be charged earlier than expected. For further illustrative purpose, the standard time for next battery recharge of the car was 48 hours, however, in this example the car is back for charging within 36 hours which means that the car has to be charged 12 hours earlier than the standard time. However, in this technology the data management computing apparatus 14 cannot accurately identify the cause for the electric car to be charged earlier than expected as the time series data obtained from the sensors 34 as the time series data of the car does not show any battery degradation.

Accordingly for further investigative purposes, the data management computing apparatus 14 obtains heterogeneous data from plurality of data servers 17 and the social network database 17, such as the driver internal blogs which indicate that the driver was behind on his delivery schedule for the day he charged the vehicle.

Next, the data management computing apparatus 14 retrieves the contextual data, such as the ambient temperature, from another heterogeneous data source based on the model relationship and determines the ambient temperature was above a stored threshold after the car was charged. The data management computing apparatus 14 retrieves other contextual data which indicates that ambient temperatures above that threshold lead to a shorter battery life.

Additionally, the data management computing apparatus 14 retrieves other heterogeneous business related blog data, such as information noted in a driver log data which indicated the driver was scheduled to visit an especially difficult customer and that the customer may lodge a complaint if the driver was late for delivery and this caused the driver to exceed speed recommendations, using more energy of the battery than normal.

Based on car battery information, the driver's internal blog, the ambient temperature and the driver log data, the data management computing apparatus 14 identifies the actual cause of the early recharge of the car to be negligence of the driver. Accordingly, the data management computing apparatus 14 provides improvement steps indicating that the driver may need to be reminded of proper hours and vehicle use and also indicates that the battery is in good condition and does not require any servicing.

Accordingly, as illustrated and described with the examples herein this technology provides a number of advantages including providing more effective and efficient methods, non-transitory computer readable medium and device for analyzing time series data. With this technology, a wide variety of different types of data, such as business related data, social media data and unstructured data, can be easily identified and accessed. Further, this technology does not require the data to be first loaded into a rigid model which can only be accessed in limited manners.

Having thus described the basic concept of this technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of this technology. Additionally, the recited order of processing elements or sequences, or the use of numbers, letters, or other designations therefore, is not intended to limit the claimed processes to any order except as may be specified in the claims. Accordingly, this technology is limited only by the following claims and equivalents thereto.

What is claimed is:

1. A method for managing time series data of monitored assets, the method comprising:
   connecting, to a network, a system for managing data associated with a plurality of monitored asset devices, the network including the plurality of monitored asset devices, a plurality of client computing devices, and a plurality of third party computing devices;
   storing, in a memory associated with the system for managing data, time series activity streams including time series data originating from the plurality of monitored asset devices,
   wherein each of the time series data includes at least one of tags, metadata and a time stamp;
   retrieving, by a processor of the system for managing data, first time series data associated with a first monitored asset device of the plurality of monitored asset devices;
   identifying an anomaly period among the retrieved first time series data of the first monitored asset device, the anomaly period indicating an anomaly in operation of the first monitored asset device,
      wherein the anomaly period is identified based on at least one of (i) a comparison of the first time series data to threshold values of the first monitored asset device, (ii) a calculation determining that the first time series data exceeds a predetermined standard deviation, and (iii) an input including an anomaly notification;
   retrieving, by the processor, responsive to the identification of the anomaly period, first heterogeneous data associated with the anomalous period, the first heterogeneous data being different than the first time series data,
      wherein the heterogeneous data is originated from at least one of (i) the memory associated with the system for managing data, (ii) the plurality of monitored asset devices, (iii) the plurality of client computing devices, and (iv) the plurality of third party computing devices; and
   transmitting, by the processor, to one of the client computing devices, at least two of (i) a result set including at least a portion of the first time series data and the first heterogeneous data, (ii) a cause of the anomaly occurring in the anomaly period, determined based at least in part on the first heterogeneous data, and (iii) a corrective step to correct the anomaly,
      wherein the corrective step includes instructions identified based on at least one of (i) correlating the cause of the anomaly to a table of corrected steps stored in the memory associated with the system for managing data, (ii) receiving inputs from computing devices of technical experts or manufacturers, and (iii) identifying suggestions in social network databases.

2. The method of claim 1, wherein the first heterogeneous data includes data associated with a time prior to or during the anomalous period.

3. The method of claim 1, wherein the heterogeneous data includes structured and/or unstructured data and includes at least one of (i) heterogeneous contextual data, and (ii) heterogeneous related asset data.

4. The method of claim 3,
   wherein the memory stores a hierarchical relationship model defining associations among the plurality of monitored asset devices,
   wherein the retrieving the first heterogeneous data includes retrieving heterogeneous related asset data from one or more related monitored assets of the plurality of monitored asset devices, and
   wherein the one or more related monitored assets are determined based on hierarchical relationship model of the first monitored asset device.

5. The method of claim 1, wherein the heterogeneous data includes heterogeneous contextual data originating from one or more of data servers and social network databases.

6. The method of claim 1, wherein the retrieval of the first time series data associated with a first monitored asset device is performed in response to receiving a request from one of the plurality of client computing devices,
   wherein the request includes at least one keyword, and
   wherein the first time series data is identified from the time series activity streams based on a query using the at least one keyword included in the request and the tags of the time series data in the time series activity streams.

7. The method of claim 1, wherein each of the plurality of monitored asset devices include corresponding sensors, and wherein the time series activity streams are received periodically or in real time from the sensors of the plurality of monitored asset devices.

8. The method of claim 1, comprising:
   receiving, from the sensors of one of the plurality of monitored asset devices, time series data;
   tagging, by a processor of the system for managing data, the time series data using keywords and/or metadata; and
   storing the received time series data in the memory associated with the system for managing data, the time series data being stored in association with corresponding time stamps.

9. A system for managing time series data of monitored assets, the system comprising:
a processor; and
a memory having instructions stored thereon, wherein the instructions, when executed by the processor, cause the processor to:
connect, to a network, a system for managing data associated with a plurality of monitored asset devices, the network including the plurality of monitored asset devices, a plurality of client computing devices, and a plurality of third party computing devices;
store, in the memory, time series activity streams including time series data originating from the plurality of monitored asset devices,
wherein each of the time series data includes at least one of tags, metadata and a time stamp;
retrieve first time series data associated with a first monitored asset device of the plurality of monitored asset devices, the first heterogeneous data being different than the first time series data;
determine whether an anomaly period is identified among the retrieved first time series data of the first monitored asset device, the anomaly period indicating an anomaly in operation of the first monitored asset device,
wherein the anomaly period is identified based on at least one of (i) a comparison of the first time series data to threshold values of the first monitored asset device, (ii) a calculation determining that the first time series data exceeds a predetermined standard deviation, and (iii) an input including an anomaly notification; and
if the determination identifies an anomaly period:
retrieve first heterogeneous data associated with the anomalous period,
wherein the heterogeneous data is originated from at least two of (i) the memory associated with the system for managing data, (ii) the plurality of monitored asset devices, (iii) the plurality of client computing devices, and (iv) the plurality of third party computing devices; and
transmit to one of the client computing devices, at least one of (i) a result set including at least a portion of the first time series data and the first heterogeneous data, (ii) a cause of the anomaly occurring in the anomaly period, determined based at least in part on the first heterogeneous data, and (iii) a corrective step to correct the anomaly,
wherein the corrective step to correct the anomaly includes instructions identified based on at least one of (i) correlating the cause of the anomaly to a table of corrected steps stored in the memory associated with the system for managing data, (ii) receiving inputs from computing devices of technical experts or manufacturers, and (iii) identifying suggestions in social network databases.

10. The system of claim 9, wherein the first heterogeneous data includes data associated with a time prior to or during the anomalous period.

11. The system of claim 9, wherein the heterogeneous data includes structured and/or unstructured data and includes at least one of (i) heterogeneous contextual data, and (ii) heterogeneous related asset data.

12. The system of claim 11,
wherein the memory stores a hierarchical relationship model defining associations among the plurality of monitored asset devices,
wherein the retrieving the first heterogeneous data includes retrieving heterogeneous related asset data from one or more related monitored assets of the plurality of monitored asset devices, and
wherein the one or more related monitored assets are determined based on hierarchical relationship model of the first monitored asset device.

13. The system of claim 9, wherein the heterogeneous data includes heterogeneous contextual data originating from one or more of data servers and social network databases.

14. The system of claim 9,
wherein the retrieval of the first time series data associated with a first monitored asset device is performed in response to receiving a request from one of the plurality of client computing devices,
wherein the request includes at least one keyword, and wherein the first time series data is identified from the time series activity streams based on a query using the at least one keyword included in the request and the tags of the time series data in the time series activity streams.

15. The system of claim 9, wherein each of the plurality of monitored asset devices include corresponding sensors, and wherein the time series activity stream are received periodically or in real time from the sensors of the plurality of monitored asset devices.

16. The system of claim 9, wherein the instructions, when executed by the processor, cause the processor to:
receive, from the sensors of one of the plurality of monitored asset devices, time series data;
tag the time series data using keywords and/or metadata; and
store the received time series data in the memory associated with the system for managing data, the time series data being stored in association with corresponding time stamps.

* * * * *